H. C. HUGHES.
AUXILIARY STEERING DEVICE FOR AUTOMOBILES.
APPLICATION FILED FEB. 21, 1919.
1,434,543.
Patented Nov. 7, 1922.
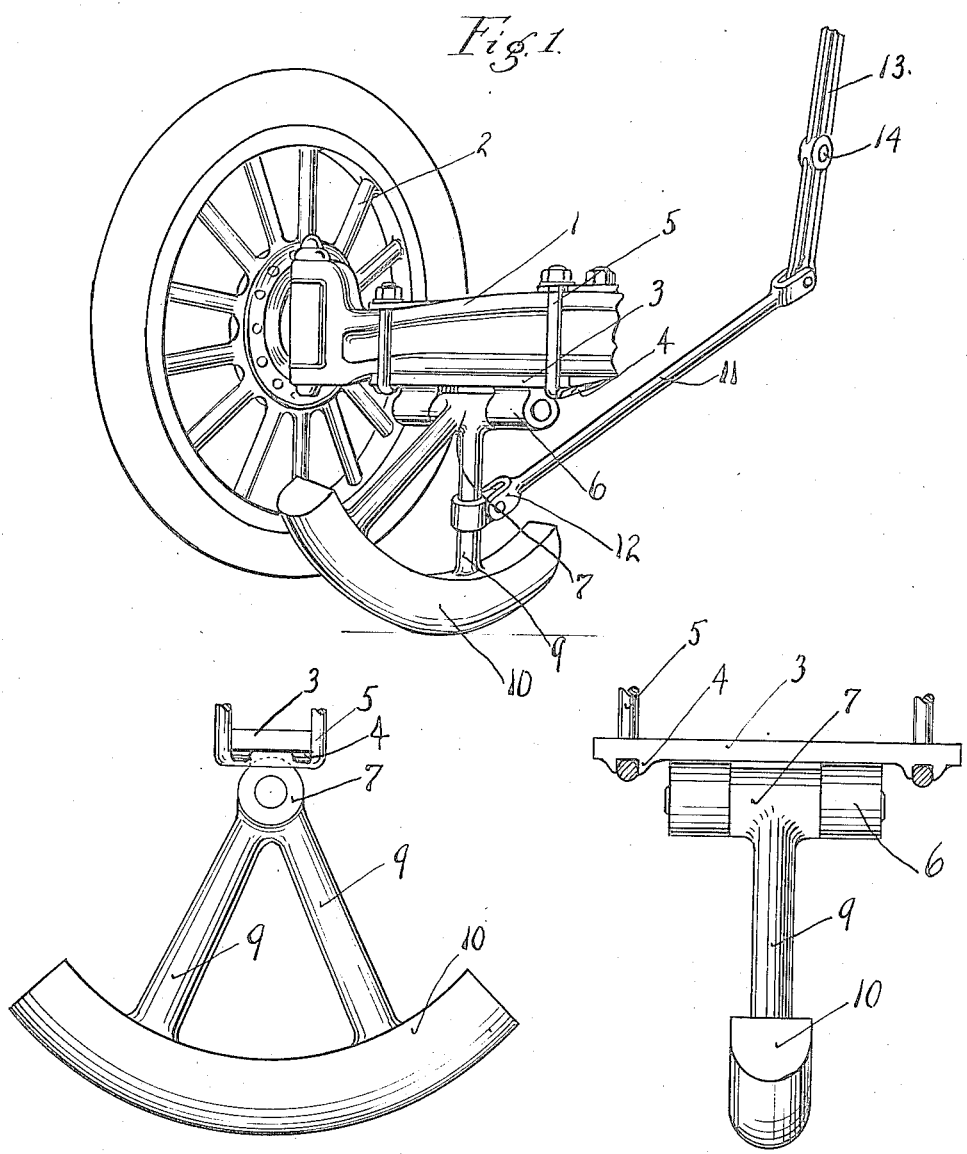

Patented Nov. 7, 1922.

1,434,543

UNITED STATES PATENT OFFICE.

HARRY C. HUGHES, OF CINCINNATI, OHIO.

AUXILIARY STEERING DEVICE FOR AUTOMOBILES.

Application filed February 21, 1919. Serial No. 278,339.

*To all whom it may concern:*

Be it known that I, HARRY C. HUGHES, a citizen of the United States, and a resident of Cincinnati, in the county of Hamilton and State of Ohio, have invented certain new and useful Improvements in Auxiliary Steering Devices for Automobiles, of which the following is a full, clear, and exact description, reference being had to the accompanying drawing, forming part of this specication.

My invention relates to the steering of automobiles in particular and to vehicles having a pivot axle front wheel or wheels in general. It has as its object the provision of a device which will automatically raise the weight of the vehicle from the front wheels and permit them to be turned by the steering device of the vehicle. When an automobile is close behind an obstruction, such as another vehicle, it is not possible to run the car ahead and thus turn the wheels with the car in motion, and yet the wheels can be turned only with difficulty, and great strain on the steering devices, if it is done with the car standing still.

It is my object to provide for the turning of the wheels of the car in such predicaments by relieving the weight of the car on the wheels and thus freeing them for turning, after which the lifting device can be released to lower the wheels again to the road. I have found that the relieving of the weight on the wheels is all that is necessary, and that the wheels need not be raised entirely from the road. I have found also that the lifting of the car need not be done at the exact center of gravity thereof, since the main point is relieving the wheels of weight and not jacking up the car.

My objects I accomplish by that certain construction and arrangement of parts to be hereinafter more specifically pointed out and claimed.

In the drawing,

Figure 1 is a perspective view of a portion of the axle and a wheel of an automobile.

Figure 2 is a side elevation of the device.

Figure 3 is a front elevation thereof.

The automobile front axle 1 is shown with the pivot axle wheel 2. A plate 3 having on its ends suitable ridges 4 to form channels is secured to the axle by means of straps or clips 5, 5, which are hung on the axle.

The plate has trunnions 6, 6 on its under side, and in these trunnions is pivoted the hub 7 of the lifting device.

There are two spokes 9, 9, and a rim 10, which complete the lifting device, which has the form of a segment of a wheel. The spokes and rim are proportioned so as to give to the rim a wider curve than the wheels 2, and the pivot of the hub member of the device is lower than the hub of the wheels 2, whereby the dropping of the rearward end of the rim of the lifting device on the ground and driving forward of the vehicle would bring the axle upwardly and release the wheels 2 from the weight of the vehicle.

To manipulate the lifting device a rod 11 is pivoted thereto at 12 and is at its rear end pivotally connected to an operating rod or lever 13. The lever is pivoted at 14 to whatever framework may be available (not shown), so that when pushed or pulled from above it will draw rearwardly or move forwardly the rod 11.

The operation of the device is as follows: The driver of the car desirous of turning the front wheels sharply without driving his car forward or back at the same time, pushes forward on the operating lever and drops the rear end of the curved rim to the ground. He then starts his engine, and permits the car to drive forward so as to rock downwardly the lifting device and raise up on the front axle. The car will be easily controlled in this movement as the raising of the front wheels from the ground and the movement of the operating lever will indicate the time for releasing his clutch. Any usual means for limiting the movement of the operating lever will serve to prevent the lifting device from revolving far enough for the vehicle to drop down from its forward end.

As soon as the weight is relieved on the wheels, the driver can easily turn them as far as they will go, and then by pushing forward on the operating lever 13 he can readily roll the car back, and permit the weight to come on the front wheels again. Upon once more letting in the clutch the car will start forward at the desired angle.

It can be observed that the operation of the device permits the turning of the front wheels, while the vehicle is standing still and practically without change of position. The device is not a jack, but is rather a pivoted foot on the front axle of a vehicle which is shaped to permit the riding of the vehicle upwardly upon it, and connected up so that it can be pushed forwardly by the operator of the car, with the result of backing the car to its original position. It is the fact that the car comes back to its original position and that the device does not attempt to lift both the front wheels any distance from the ground that makes this practical device, and distinguishes it from some form of lifting jack secured to the body of the car.

Having thus described my invention, what I claim as new and desire to secure by Letters Patent, is:—

In combination with the front axle of a motor vehicle, pivot axle steering wheels thereon, a pivoting member, mounted on said front axle, a wheel segment mounted on said pivoting member, the periphery of said segment being adapted, when swung down, to elevate or relieve the strain on the said steering wheels, and manually controlled means for raising said segment forwardly of the vehicle from contact position with the ground, and lowering it into such position, whereby the sharp turning of the front wheels of a vehicle may be accomplished by driving the vehicle forward over the segment shaped member thereby relieving the front wheels from strain so that they can be turned.

HARRY C. HUGHES.